United States Patent [19]

Iwasawa et al.

[11] Patent Number: 4,516,138

[45] Date of Patent: May 7, 1985

[54] TIME-CLOCK RECORDING AND COMPUTATION APPARATUS WITH OPTIONAL REST PROCESSING FUNCTION

[75] Inventors: Hiroshi Iwasawa; Masanori Numata; Shinichi Mama, all of Yokohama, Japan

[73] Assignee: Amano Corporation, Yokohama, Japan

[21] Appl. No.: 543,941

[22] Filed: Oct. 19, 1983

[30] Foreign Application Priority Data

Oct. 20, 1982 [JP] Japan ............................... 57-184082

[51] Int. Cl.[3] ............................................ G06K 1/00

[52] U.S. Cl. ..................................... 346/80; 235/377

[58] Field of Search .................................. 346/80–86; 364/400, 401; 235/377; 194/DIG. 18

[56] References Cited

U.S. PATENT DOCUMENTS

| | | | |
|---|---|---|---|
| 3,641,321 | 2/1972 | Tonne | 346/80 |
| 4,333,085 | 6/1982 | Witts | 235/377 |
| 4,423,314 | 12/1983 | Kato et al. | 235/377 |
| 4,423,315 | 12/1983 | Kato et al. | 235/377 |

*Primary Examiner*—E. A. Goldberg

*Assistant Examiner*—A. Evans

*Attorney, Agent, or Firm*—Wenderoth, Lind & Ponack

[57] ABSTRACT

A time-clock recording and computation apparatus of which operation is controlled by a microcomputer, includes computation means comprising a data storage unit (107) in which attendance data based on a predetermined attendance system are stored, and a processing unit (100) effecting predetermined calculation based on the data stored in said data storage unit. The apparatus further includes optional rest processing means provided in the computation means. The optional rest processing means is operative to execute predetermined processing comprising the steps of storing parameters in respect of an optional rest in the data storage unit, effecting comparative judgement between the data indicative of entering and leaving and optional rest processing patterns based on said parameters, and sequentially summing up the processed results in the data storage unit. Thus, with the optional rest processing means, it is possible to output as to whether the actual optional rest is suitable or not with respect to the attendance system, a region whether an optional rest is obtainable and a time interval to be obtained on the basis of the summed up data. Accordingly, the apparatus of the invention makes it possible to properly deal with time in connection with the optional rest, and to automatically record the results thereof.

12 Claims, 13 Drawing Figures

FIG. 4

(A)

PERSONAL FILE

| |
|---|
| LAST PRINTING TIME (PS·PT) |
| CURRENT PRINTING TIME (CU·PT) |
| FIAG INDICATING THAT OPTIONAL REST HAS BEEN ACQUIRED (FBGF) |
| |
| TOTAL PRIVATE GOING OUT TIME (INT ACC) |
| TOTAL ATTENDANCE HOURS (NET ACC) |
| |

(B)

PARAMETER FILE

| |
|---|
| OPTIONAL REST COMMENCEMENT TIME (TS) |
| OPTIONAL REST END TIME (TE) |
| TOTAL OPTIONAL REST TIME (BT) |
| |

(C)

TABLE SHOWING LAST PRINTING TIME (PS·PT) AND CURRENT PRINTING TIME (CU·PT) AT THE TIME OF IN OR OUT PRINTING.

| | PS · PT | CU · PT |
|---|---|---|
| IN PRINTING | OUT PRINTIG TIME | IN PRINTING TIME |
| OUT PRINTING | IN PRINTING TIME | OUT PRINTING TIME |

TIME-CLOCK RECORDING AND COMPUTATION APPARATUS WITH OPTIONAL REST PROCESSING FUNCTION

BACKGROUND OF THE INVENTION

The present invention relates to a time-clock recording and computation apparatus, and more particularly to an apparatus capable of effecting optional rest processing.

Generally, various kinds of attendance time systems including optional rest are employed in accordance with the sort of occupations. For instance, the optional rest in connection with service business is such that each employee optionally in shift acquires lunch rest time of e.g. sixty (60) minutes between 11 a.m. and 2 p.m. The optional rest in such a case is dealt as follows; When an employee takes a rest having a time period more than sixty minutes, his or her attendance time is reduced by the time exceeding the regular lunch recess of sixty minutes. On the contrary, when the employee takes a rest of which time interval lies within sixty minutes, it is considered that he or she has acquired a rest of sixty minutes.

Heretofore, suitable methods of dealing with such optional rest time and of recording the results have not been established.

For instance, when recording means, such as, time recorder (time-clock recording apparatus) is not used, man who takes an optional rest orally reports or notifies the commencement and/or the end thereof to managers, such as his or her superiors or colleagues in his or her office or a working place. However, with such an oral reporting, it is impossible to record the executed optional rest, resulting in losing or lacking in justice. As result, it happens that morality in the working place is lowered.

On the other hand, when using a time-clock recording apparatus, the recording is effected such that the time in respect of departure and arrival is printed on a time card. Hitherto, man judged each time the attendance condition with reference to the printed records to calculate total attendance time. However, such a prior art method results in much human labour and errors in calculating. Particularly, this makes it difficult to automatically perform wage total calculation in a working place where a large number of working men attend.

SUMMARY OF THE INVENTION

With the above in view, an object of the present invention is to provide a time-clock recording and computation apparatus capable of effecting optional rest processing.

Another object of the invention is to provide an apparatus makes it possible to automatically effect optional rest processing judgement in accordance with each processing pattern in respect thereof, with a time-clock recording and computation device capable of automatically totally recording attendance condition.

Another object of the invention is to provide an apparatus wherein when rest time exceed a preselected rest time, the apparatus allows to sum up the excess of time, in an item classified as a minus item with respect to the actual attendance time, such as, "the total private going out time", and to at the same time, sum up actual attendance time in an item, such as "total actual attendance hour", thereby to automatically print out monthly total results as information indicative of total calculation to be based on wedge calculation.

Another object of the invention is to provide an apparatus makes it possible to facilitate troublesome attendance time calculation including optional rest time so that justice with respect to each employee can be kept and errors occuring in the calculation can be prevented.

To achieve these objects, a time-clock recording and computation apparatus according to the present invention is characterized in that the judgement processing is effected on the basis of optional rest time processing patterns determined by the setting of parameters, such as, section or region where predetermined optional rest is obtainable, or rest time to be acquired, and that the processed data are sequentially stored in summing-up-areas alloted with respect to each person in a data storage unit, and that a warning mark is printed on a time card, for instance, when an actual optional rest exceeds a predetermined time interval.

BRIEF DESCRIPTION OF THE DRAWINGS

The features and advantages of a time-clock recording and computation apparatus with optional rest processing function according to the present invention will become more apparent from the following description taken in conjunction with the accompanying drawings, in which:

FIG. 2 is a block diagram illustrating an example of circuit construction of the time-clock recording and computation apparatus shown in FIG. 1, FIGS. 3(A) to 3(F) are views for explaining optional rest processing function endowed by the present invention wherein

DETAILED DESCRIPTION OF PREFERRED EMBODIMENT

Figure 1:
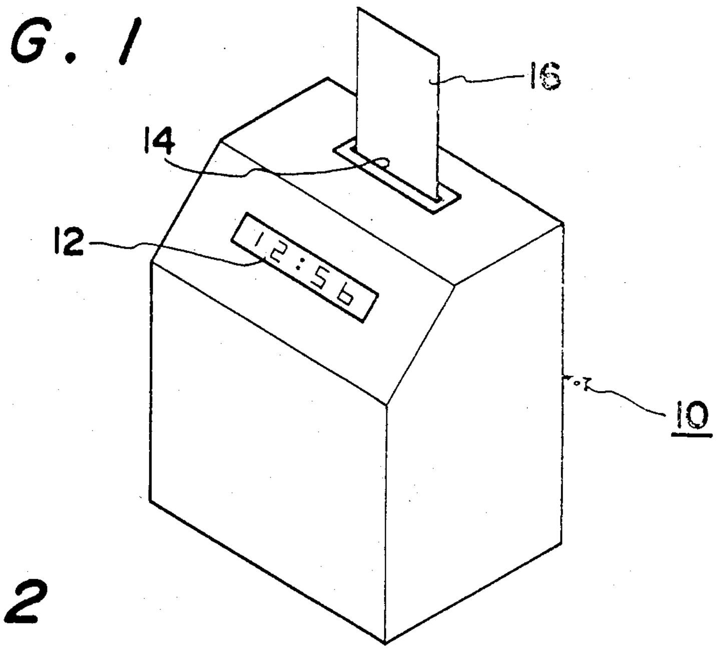
FIG. 1 is a perspective view schematically illustrating a time-clock recording and computation apparatus to which the present invention is applied.

Referring to FIG. 1, there is shown a perspective view of a time-clock recording and computation apparatus capable of automatically totally recording attendance condition to which the present invention is applied. The time-clock recording and computation apparatus comprises a housing 10, a display unit 12 provided at the front surface of the housing 10, and a card receiving pocket 14 through which a time card 16 is inserted.

Figure 2:
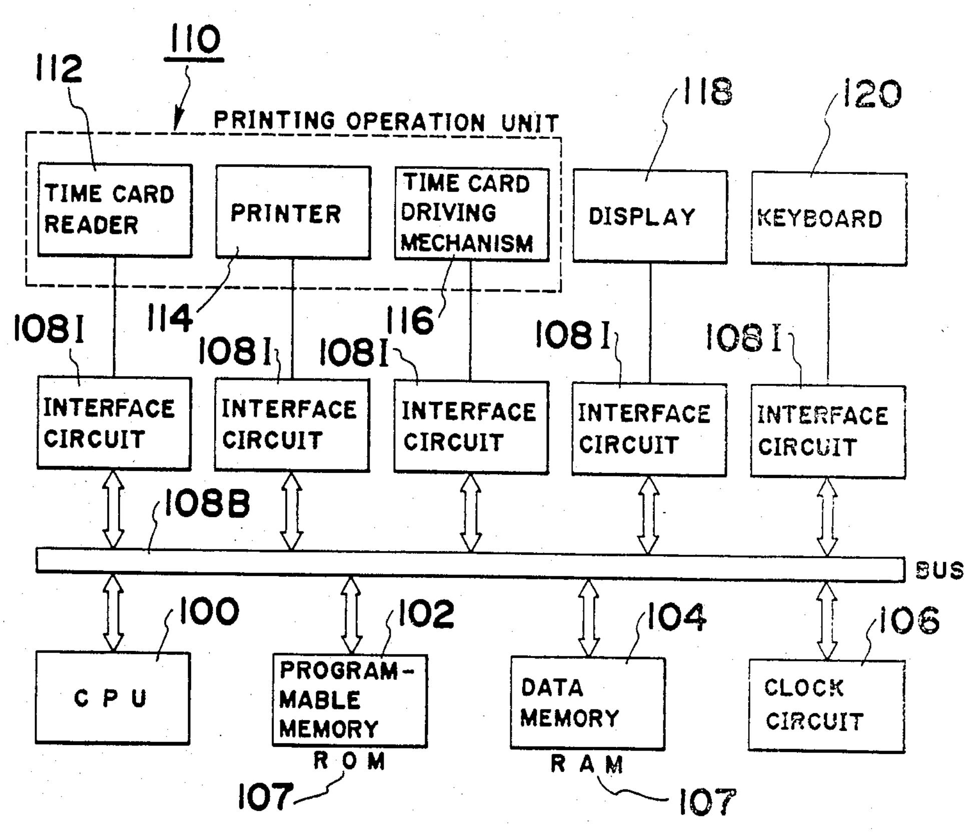

Then, the circuit construction of the time-clock recording and computation apparatus shown in FIG. 1 will be described with reference to FIG. 2.

The circuitry of the apparatus includes a microcomputer comprising a central processing unit (CPU) 100 for supervising the operation of the microcomputer, a programmable memory essentially comprised of a read only memory (ROM) 102, and a data memory essentially comprised of a random access memory (RAM) 104. A data storage unit 107 is constituted by the programmable memory 102 and the data memory 104. The circuitry further comprises a time clock circuit 106, a plurality of interface circuits 108I electrically coupled to the CPU 100 through a bus 108B. To the interface circuits are coupled, a printing control unit 110 for a time-clock recording apparatus, a display area 118 identical with the above-mentioned display unit 12, and a key board 120 for effecting a predetermined setting, respectively. As is well known, the printing control unit 110 comprises a time card reader 112, a printer 114 and a card driving mechanism 116.

The time-clock recording and computation apparatus is constituted so that the whole operation is controlled under the supervision of the CPU 100 using information stored in the data storage unit 107, particularly in the program memory 102.

The operation thereof is as follows; When each person, such as, employee inserts the time card 16 into the card receiving pocket 14 every time he enters his office or a working place and leaves therefrom, the card driving mechanism 116 allows the time card 16 to move to a predetermined position within the apparatus. At the same time, the time card reader 112 reads out the codes for identifying each employee described on the time card 16. The CPU 100 performs judgement processing of the attendance or working information on the basis of parameters preset by the key board 120 and helps to indicate them on the display unit 118. The above-mentioned parameters, as referred to later, includes time indicative of commencement and the completion of attendance, commencement and completion of section or time interval of optional rest obtainable or able to acquire with respect to each employee, or total rest time to be acquired. Thus, the CPU 100 helps to sum up serially the results in the summing up area RAM 104 in respect to each employee, and if necessary, allows the printer 114 to print time information and an irregular mark indicative of exceptional attendance, such as, late coming, early leaving or private going out.

Figure 3:
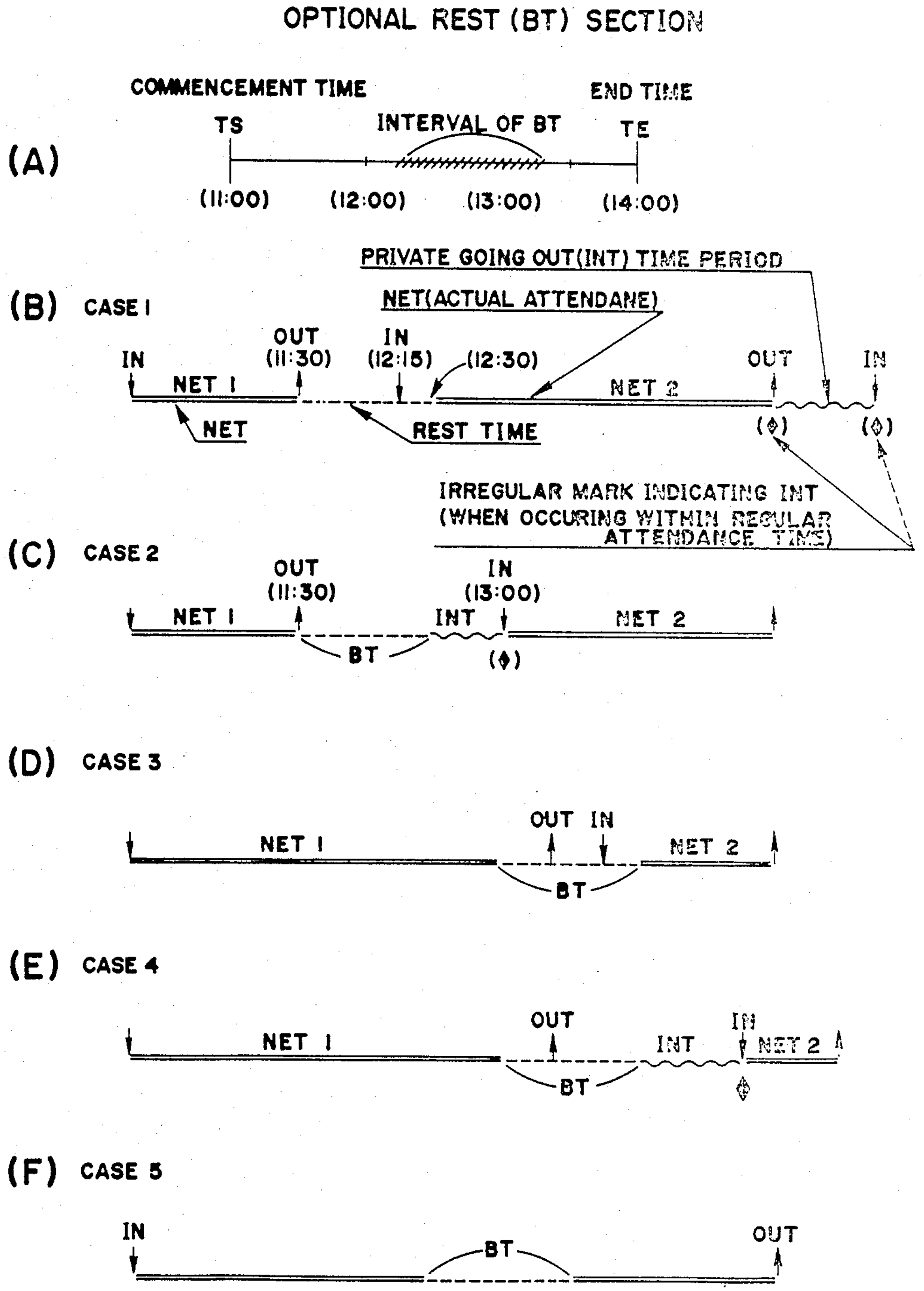
FIG. 3(A) shows the relationship between an optional rest time interval and rest time to be acquired, and FIGS. 3(B) to 3(F) examples of optional processing pattern based on the FIG. 3(A), FIGS. 4(A) to 4(C) are memory maps each showing the data structure stored in the data memory of FIG. 2.

Reference is now made to the definition of optional rest which is the subject matter of the invention in conjunction with FIG. 3(A).

The region (section) where each employee is obtainable to take a rest is defined by a time interval from starting (commencement) time TS to ending (completion) time TE. A rest time interval BT to be acquired can be decided or set within this section. Users can desirably determine these parameters. Namely, they can actually in advance store necessary parameters in parameter areas provided in the data memory 104 using the keyboard 120.

The rule in connection with judgement processing according to the present invention with these parameters will be described with reference to optional rest processing patterns.

Assume that $TS=11{:}00$ (a.m.), $TE=14{:}00$ (2:00 p.m.), and $BT=60$ minutes. Based on this assumption, the example shown in FIGS. 3(A) indicates the optional rest section where the starting time is 11:00, and the ending time is 14:00. A necessary optional rest time BT can be acquired within this section.

(i) The optional rest processing pattern 1 is shown in FIG. 3(B). This example shows that an employee enters a working place at a predetermined time, such as, 9:00 a.m., effects his attendance in the morning at the working place (in this case, his actual attendance, or net attendance is labelled by NET 1), goes out for a lunch at 11:30 a.m. which is within the regular optional rest section, and returns to the working place at 12:15 (0:15 p.m.). Further, the example shows that he effects his attendance in the afternoon from 12:30 (0:30 p.m.), and personally goes out (in this case, his private going out, or his intermission is labelled by INT) from 16:00 (4:00 p.m.) to 17:00 (5:00 p.m.) within the attendance time period in the afternoon. In this instance, the time-clock recording and computation apparatus considers that he has been personally away from his working place within the predetermined attendance time interval. As a result, an irregular mark as shown in attached using means to be described later. The generalized expression in connection with the way how the optional rest is taken in this case is as follows; because $IN(12{:}15)-OUT(11{:}30)<60$ minutes, $IN-OUT\leqq BT$. Accordingly, the commencement of the attendance in the afternoon in terms of optional rest processing is $OUT+BT(11{:}30+60$ minutes), that is, 12:30 (0:30 a.m.) irrespective of the commencement of the actual attendance.

(ii) The optional rest processing pattern 2 is shown in FIG. 3(C). Similar to the pattern 1, the employee goes out for a lunch at 11:30 a.m. However, in this case, he returns to the working place at 13:00 (1:00 p.m.) which exceeds the rest time interval BT. In this instance, an interval from 12:30 to 13:00 (1:00 p.m.) is considered as a private going out, that is, an intermission (INT). The generalized expression in this case is $IN-OUT>BT$. Accordingly, the time period from the commencement of the rest 11:30 to $OUT+BT$ (12:30) is considered as rest time, while the time period from 12:30 to IN (13:00) is considered as a private going out time interval labelled by INT. Accordingly, the irregular mark as shown for indicating that he has taken a rest exceeding the regular rest time interval is attached.

(iii) The optional rest processing pattern 3 is shown in FIG. 3(D). In this pattern 3, the actions symbolized by OUT and IN are effected within the regular rest time interval BT. The generalized expression in this case is $OUT+BT>TE$. Accordingly, the actual attendance NET is considered as a time period from the commencement to TE-BT ($14{:}00-60$ minutes$=13{:}00$). As long as $IN\leqq TE$ holds, the actual attendance in the afternoon NET2 starts at the time showing the completion of the rest labelled by TE. Accordingly, the employee is under obligation to take a rest time BT within an interval from TS to TE. Even if the employee does not take rest time BT, a time period of the rest time BT is subtracted from the actual attendance hour.

(iv) The optional rest processing pattern 4 is shown in FIG. 3(E). This case corresponds to the instance that the employee returns to his working place exceeding the rest end time TE. Accordingly, the time period from TE to IN is considered as a private going out (INT).

(v) The optional rest processing pattern 5 is shown in FIG. 3(F). In this instance, since IN and OUT actions do not exist within the regular attendance hours, the actual attendance hour is obtained by subtracting the rest time interval from IN to OUT from the total actual attendance hours.

Referring now to FIGS. 4(A) to 4(C), there are shown examples of the memory content to be stored in a predetermined memory area of the data memory 104. A personal file is shown in FIG. 4(A). For example, areas contained in the personal file are as follows: Last printing time at which the user has previously printed, symbolized by PS.PT; Current printing time at which the user has printed at this time, symbolized by CU.PT; Flag indicating that optional rest has been acquired, symbolized by FBGF; Total private going out time, that is, accumulated intermission, symbolized by INT ACC; and Total attendance hours, that is, accumulated net attendance hours, symbolized by NET ACC.

A parameter file is shown in FIG. 4(B). For example, areas contained in the parameter file are as follows: Optional rest commencement time at which optional rest starts, symbolized by TS; Optional rest end time, that is, completion of an optional rest, symbolized by TE; and Total optional rest time, that is, a time interval of an optional rest, simbolized by BT.

Further, there shown in FIG. 4(C), a Table showing last printing time (PS.PT) and current printing time (CU.PT), at the time of IN or OUT printing.

Figure 5:
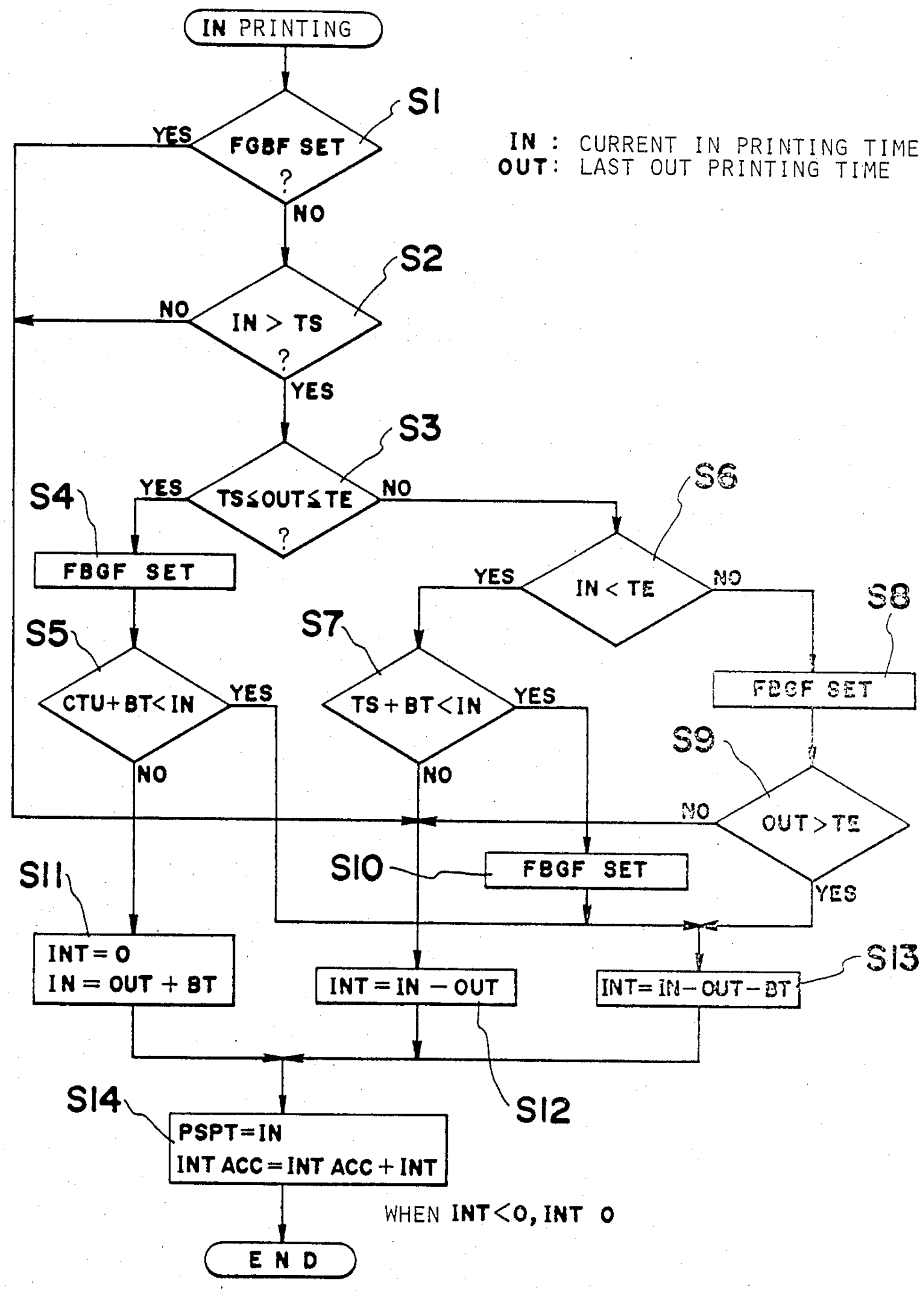
FIG. 5 is a flowchart showing the procedure for an IN printing processing according to the present invention.

The processing procedure at the time of IN printing will be described with reference to the flowchart shown in FIG. 5.

Step S1: judges as to whether the flag FBGH indicating that the optional rest has been acquired is set. When the result of the judgement is "YES", that is, the optional rest has been acquired, the program execution shifts to the step S12 to be referred to later, at which the calculation for a private going out is effected, irrespective of subsequent processings. On the contrary, when the result of the judgement is "NO", the program execution shifts to the step S2. Thus, the calculation in which time zone the optional rest is obtained, is effected at subsequent steps.

Step S2: judges as to whether the current entering time IN is later than the rest commencement time TS, namely, effecting a comparative judgement regarding IN>TS. When the result of the judgement is "YES", the program execution shifts to the step S3, while when the result of the judgement is "NO", because the optional rest has not yet commenced, the program execution shifts to the step S12 for effecting calculation in connection with the private going out, similar to the case of "YES" in the step S1.

Step S3: effects comparative judgement in connection with TS≦OUT≦TE, namely, effects a comparative judgement as to whether the last OUT printing time lies within the optional rest section, and therefore the program execution shifts to the step S4 for setting the flag indicating that the optional rest has already acquired. On the contrary, the result of the judgement is "NO", the program execution shifts to the step S6.

Step S4: effects setting operation of a flag FBGF indicating that the optional rest has been already acquired.

Step S5: effects a comparative judgement regarding OUT+BT<IN, that is, judges as to whether the time interval (going out time+rest time interval) is earlier than the last IN printing time. When the result of the judgement is "YES", the program execution shifts to the step S13 to be referred to later, while when the result of the judgement is "NO", the program execution shifts to the step S11.

Step S6: effects comparative judgement regarding IN<TE, that is, effects comparative judgement as to whether the entering time IN is later than the rest end time TE. When the result of the judgement is "YES", the program execution shifts to the step S7, while the result of the judgement is "NO", the program execution shifts to the step S8.

Step S7: effects comparative judgement regarding TS+BT<IN, that is, effects comparative judgement as to whether the time (the rest commencement time+rest time interval) is earlier than the entering time. When the result of the judgement is "YES", the program execution shifts to the step S10, while when the result of the judgement is "NO", the program execution shifts to the Step S12.

Step S8: effects setting operation of a flag FBGF indicating that the optional rest has already acquired.

Step S9: effects comparative judgement regarding OUT>TE, that is, effects comparative judgement as to whether the leaving time is earlier than the rest end time. When the result of the judgement is "YES", the program execution shifts to the step S13, while when the result of the judgement is "NO", the program execution shifts to the step S12.

Step S10: effects setting operation of a flag FBGF indicating that the optional rest has been already acquired.

Step S11: since it is judged that there exists no private going out time, that is, the employee had taken a predetermined rest time, the calculation in respect of INT=O and INT=OUT+BT is effected.

Step S12: since it is judged that the employee does not enter or go out within a predetermined optional rest time zone, and does within a predetermined attendance time interval, all his action in this case is considered as a private going out time. Accordingly, the calculation in respect of INT=IN−OUT is effected.

Step S13: since this case corresponds to the instance that the employee returns to his working place exceeding a predetermined optional rest time, the excess of time is considered as a private going out time, the calculation in respect of INT=IN−OUT−BT is effected.

Step S14: because of the processing at the time of IN printing, the setting PSPT=IN is effected on the basis of the calculated result at the steps S11, S12 and S13, and in order to sum up the private going out time, the summing up calculation in respect of INT ACC=INT ACC+INT is effected. In this instance, when INT<0, the INT=0.

Figure 6:
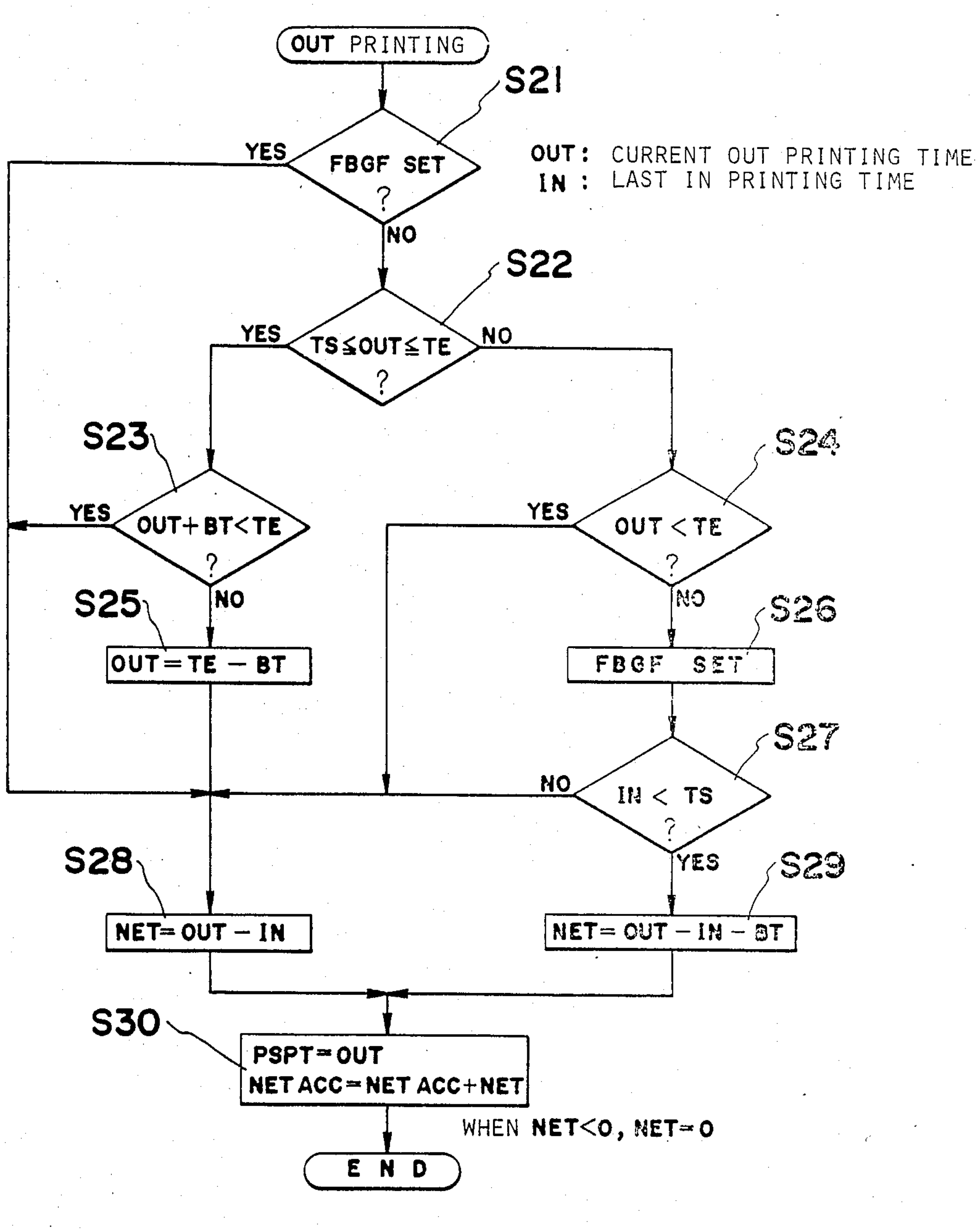
FIG. 6 is a flowchart showing the procedure for OUT printing processing according to the present invention.

Reference is made to the OUT printing processing procedure in conjunction with the flowchart shown in FIG. 6.

Step S21: judges as to whether the flag FBGF indicating that the optional rest had been acquired. When the result of the judgement is "YES", the program execution shifts to the step S28 to be referred later for calculating as actual attendance independent of the subsequent processings. On the contrary, when the result of the judgement is "NO", the program execution shifts to the step S22 for judging as to whether the OUT printing time is within a predetermined optional rest section.

Step S22: effects comparative judgement in respect of TS≦OUT≦TE, namely, effects a judgement as to whether the employee leaves from his working place between the preselected optional rest commencement time TS and the end time TE. When the result of the judgement is "YES", the program execution shifts to the step S23, while when the result of the judgement is "NO", the program execution shifts to the step S24.

Step S23: effects comparative judgement in respect of OUT+BT<TE, that is, effects judgement as to whether the value obtained by adding a predetermined rest time to the instant OUT printing is earlier than the optional rest time end time TE. When the result of the judgement is "YES", it is judged that the employee had already acquired the optional rest. As a result, the program execution shifts to the step S28, similar to the case of "YES" at the step S21. On the contrary, when the result of the judgement is "NO", the program execution shifts to the step S25.

Step S24: effects comparative judgement in respect of OUT<TE, namely, effects a judgement as to whether the leaving time is earlier than optional rest end time TE. When the result of the judgement is "YES", the program execution shifts to the step S28 indicating that the current OUT printing is earlier than the optional rest section on the basis of the judgement of the step S22. On the contrary, when the result of the judgement is "NO", the program execution shifts to the step S26 indicating that the current printing is later than the optional rest section on the basis of the judgement at the step S22.

Step S25: effects calculation of OUT=TE−BT. Namely, the time interval obtained by subtracting a predetermined rest time interval from the optional rest time is a leaving time.

Step S26: effects a setting operation of the flag FBGF indicating that the employee had already acquired the optional rest.

Step S27: effects comparative judgement is respect of IN<TS, that is, effects comparison as to whether the entering time is earlier than the optional rest commencement time TS. When the result of the judgement is "YES", the program execution shifts to the subsequent step S29 while when the judgement is "NO", the program execution shifts to the step S28.

Step S28: effects calculation in respect of NET=-OUT−IN. Namely, the time interval obtained by subtracting the entering time from the leaving time is actual attendance hours.

Step S29: effects calculation in respect of NET-=OUT−IN−BT. Namely, the time interval obtained by subtracting the entering time and the rest time interval from the leaving time is actual attendance hours.

Step S30: because of OUT printing processing, the setting PS.PT=OUT is effected. Further, in order to sum up the actual attendance hours, the calculation in respect of NET ACC=NET ACC+NET is effected.

The time-clock recording and computation apparatus with optional rest processing function according to the present invention can provide following advantages.

(1) It is possible to properly administrate time in connection with the optional rest, and to automatically record the results thereof.

(2) By setting parameters, such as, the section in which the employee can acquire optional rest, or the time interval to be obtained in connection with the optional rest processing, the desired processing patterns can be obtained. The processing patterns thus obtained makes it possible to effect judgement processing. Accordingly, the optional rest processing is applicable to various kinds of attendance time system.

(3) It is possible to utilize a flag indicating that the employee had already acquired the optional rest in such a manner that solely one optional rest is possible with respect to each employee. Thus, the flag can be utilized in harmony with an actual attendance situation. Conversely, when such a flag is not utilized, it is possible to take a desired number of optional rests for a predetermined time interval at a desired time within attendance time hours. This can implement flexibility to the optional rest processing.

(4) When the actual optional rest exceeds a predetermined region where the optional rest should be acquired or the time interval to be acquired, the apparatus is devised so that an warning mark, such as, irregular mark is printed on a time card. Thus, this makes it possible to warn the employee.

(5) The subtraction of the total or summed up optional rest hours from the actual attendance hours makes it easy to automatically effect wage calculation in which an optional rest is taken into account, and to print out the monthly summed up results. As a result, the labor cost required therefor can be saved. Further, it is also possible to feed the output to EDPS as source data for calculating wages through mediums, such as, floppy desk or casett tape on the basis of the application of the prior art.

As appreciated from the detailed description, the present invention makes it possible to realize time administrative method in connection with the optional rest which had not been established in the prior art. Namely, it is possible to automatically effect the recording in respect of the result, print a warning mark when the optional rest time exceeds a predetermined region or a predetermined time interval, and utilize the summed up data in connection with the optional rest when effecting wage calculations. Further, the optional rest processing pattern can be easily changed by setting predetermined parameters, resulting in wide application of various kinds of attendance time system.

Furthermore, when a flag is utilized in this processing, the optional rest processing becomes effective, while when the flag is not used in this processing, the optional rest processing becomes expandable.

While the preferred embodiment of the invention has been particularly shown and described, it will be apparent to those skilled in the art that modification can be made without departing from the principle and the spirit of the invention, the scope of which is defined in the appended claims. Accordingly, the foregoing embodiment is to be considered illustrative, rather than restricting of the invention, and modification which come within the meaning and range of equivalent of the claims are to be included herein.

What is claimed is:

1. In a time-clock recording and computation apparatus including a card driving mechanism for guiding a time card inserted into a card pocket every entering and leaving to a predetermined portion located within the apparatus, card reader means for reading out preetermined identification codes, such as personal codes described on the time card guided thereto, and computation means including a data storage unit in which attendance data based on a predetermined attendance system are stored, and a processing unit effecting predetermined calculation on the basis of the data read out by the card reader means and the attendance data fed from the data storage unit, so as to thereby effect a desired printing on the time card on the basis of the output of the processing unit, the improvement comprising means for effecting optional rest processing provided in said computation means, said optional rest processing means operative to execute predetermined processing and including means for:

(a) storing parameters with respect to an optional rest in said data storage unit, (b) effecting comparative judgement between the data indicative of entering and leaving with respect to each user and optional rest processing patterns determined by setting said parameters said processing unit, (c) sequentially summing up in said data storage unit the processed results obtained by the comparative judgement effected in said processing unit, and (d) determining whether or not the actual optional rest taken by each user is suitable with respect to said attendance system, and outputting a time condition with respect to optional rest on the basis of said summed up data.

2. A time-clock recording and computation apparatus according to claim 1, wherein said parameters contain a preselected region where an optional rest is obtainable, and a preselected rest time interval to be obtained.

3. A time-clock recording and computation apparatus according to claim 2, wherein said time condition is determined by said preselected region where an optional rest is obtainable, and a preselected rest time interval to be obtained.

4. A time-clock recording the computation apparatus according to claim 1, wherein said outputting means includes a means for printing a predetermined warning mark on the time card, when the actual optional rest exceeds at least one of the regions where an optional rest is obtainable and a time interval to be obtained.

5. A time-clock recording and computation apparatus according to claim 1, wherein said comparative judgement processing is effected with reference to a flag indicating that each user has already obtained an optional rest.

6. A time-clock recording and computation apparatus according to claim 1, wherein said processing unit effects wage calculation in which the actual optional rest time interval is taken into account on the basis of said summed up data, so as to thereby print out the monthly summed up results.

7. A time-clock recording the computation apparatus according to claim 1, which further comprises means for indicating data corresponding to printed data.

8. A time-clock recording the computation apparatus according to claim 2, wherein said outputting means includes a means for printing a predetermined warning mark on the time card, when the actual optional rest exceeds at least one of the regions where an optional rest is obtainable and a time interval to be obtained.

9. A time-clock recording the computation apparatus according to claim 3, wherein said outputting means includes a means for printing a predetermined warning mark on the time card, when the actual optional rest exceeds at least one of the regions where an optional rest is obtainable and a time interval to be obtained.

10. A time-clock recording and computation apparatus according to claim 4, wherein said comparative judgement processing is effected with reference to a flag indicating that each user has already obtained an optional rest.

11. A time-clock recording and computation apparatus according to claim 8, wherein said comparative judgement processing is effected with reference to a flag indicating that each user has already obtained an optional rest.

12. A time-clock recording and computation apparatus according to claim 9, wherein said comparative judgement processing is effective with reference to a flag indicating that each user has already obtained an optional rest.

* * * * *